United States Patent [19]

Funk et al.

[11] 4,144,449
[45] Mar. 13, 1979

[54] POSITION DETECTION APPARATUS

[75] Inventors: Buddy K. Funk, Bountiful; Clark L. Smith, Salt Lake City, both of Utah

[73] Assignee: Sperry Rand Corporation, New York, N.Y.

[21] Appl. No.: 814,060

[22] Filed: Jul. 8, 1977

[51] Int. Cl.$^2$ ............................................. G01D 21/04
[52] U.S. Cl. ................................. 250/221; 250/222 R
[58] Field of Search ........... 250/221, 222, 578, 237 R; 273/54 E; 356/1, 4; 340/258 B

[56] References Cited

U.S. PATENT DOCUMENTS

| | | | |
|---|---|---|---|
| 2,379,496 | 7/1945 | Saunier | 356/1 |
| 3,624,401 | 11/1971 | Stoller | 250/222 R |
| 3,727,069 | 4/1973 | Crittenden et al. | 250/222 R |
| 3,807,858 | 4/1974 | Finch | 340/258 B |
| 4,040,738 | 8/1977 | Wagner | 356/1 |

*Primary Examiner*—David C. Nelms
*Attorney, Agent, or Firm*—John P. Dority; William E. Cleaver; Marshall M. Truex

[57] ABSTRACT

Apparatus for detecting the position of a passive object includes a generally rectangular frame having an open interior, a source on the frame for emitting light through the frame interior from three sides thereof, a pair of linear image detectors, such as charge-coupled devices, being respectively mounted on the frame at two corners thereof being located at opposite ends of a fourth side thereof and adjacent respective opposite ends of the light source, a pair of aperture-defining devices located at the two frame corners between the detectors and the interior of the frame for configuring coincident fields of light from the frame interior for the detectors to view, and control circuitry connected to the detectors. Each of the detectors is capable of receiving its respective field of light from the frame interior and sensing interruption of light at any location within the field. The control circuitry is responsive to any interruption sensed by the detectors for determining where in the frame interior illuminated by the coincident fields of light the interruption occurred and thereby the position of the passive object which caused the interruption.

11 Claims, 5 Drawing Figures

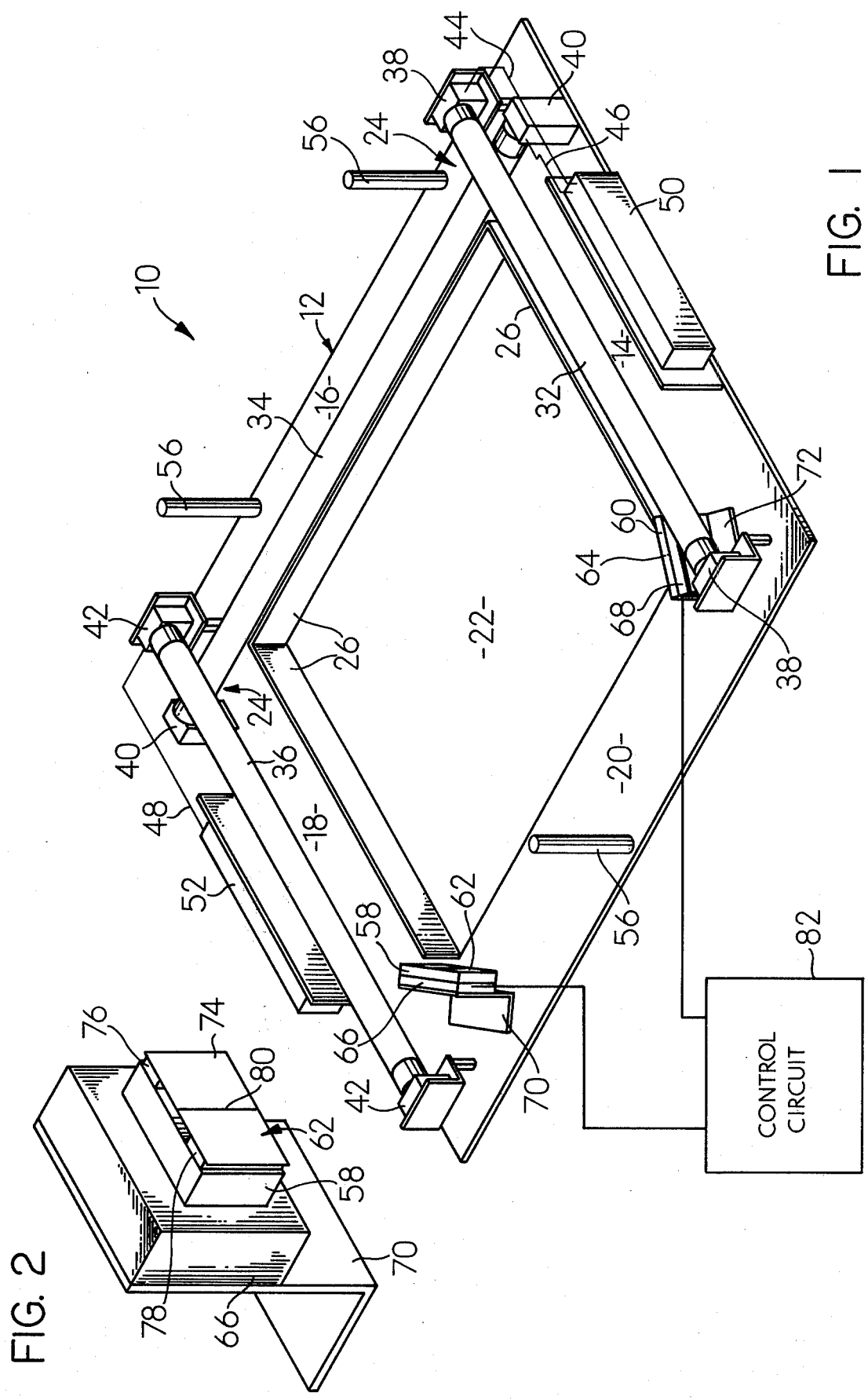

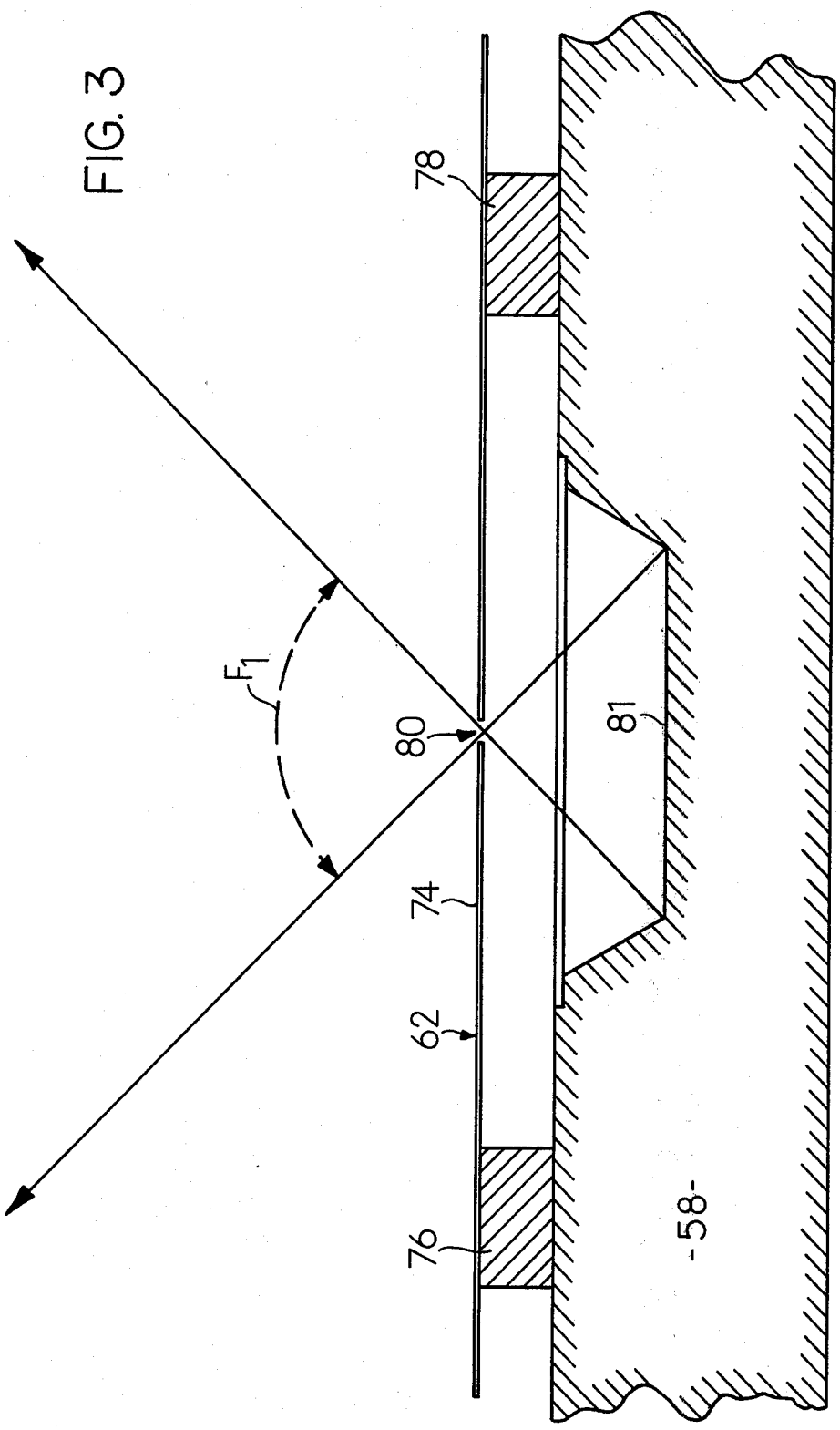

POSITION DETECTION APPARATUS

BACKGROUND OF THE INVENTION

1. Field of the Invention

The present invention broadly relates to light interruption position detection and, more particularly, is concerned with detection apparatus which includes a pair of linear image detectors, such as charge-coupled devices (CCDs), to sense interruption of a light source for facilitating the determination by associated control circuitry of where, in an X-Y plane, the interruption took place.

2. Description of the Prior Art

One type of conventional apparatus for detecting the light interruption position in an X-Y plane of a psssive object, such as a human finger or a pencil, utilizes an X-coordinate array of multiple light sources mounted along one side of a rectangular display panel and paired with a corresponding X-coordinate array of multiple light detectors mounted on the opposite side of the panel. Also, similar Y-coordinate arrays of paired multiple light sources and detectors are respectively mounted along the remaining two opposite sides of the rectangular panel. Thus, the perimeter of the panel is covered by oppositely paired arrays of light sources and detectors. Examples of such apparatus are disclosed in U.S. Pat. Nos. 3,478,220; 3,764,813; 3,775,560 and 3,860,754.

This type of detection apparatus has certain inherent disadvantages. First, spatial resolution of the apparatus is no better than the limitations imposed by the number, size and spacing of the individual light sources and detectors, one from the next in the respective arrays thereof. Thus, in some commercial equipment of this type, it is possible for the human finger to be placed between two adjacent light sources or two adjacent detectors and be missed by the parallel beams of light provided by the sources. Second, the apparatus utilizes a large number of active elements, i.e., light sources and detectors, not counting the circuitry, which are costly and have to be precisely mounted, in most cases, by manual labor. Therefore, the component cost and cost of manufacture and assembly are high. Third, the excessive number of light sources and detectors necessitates complex and costly arrangements of circuit components to operate the apparatus.

SUMMARY OF THE INVENTION

The present invention substantially overcomes the above-mentioned disadvantages of the conventional type of detector apparatus described by providing detection apparatus which incorporates a relatively low cost light source, a pair of linear image detectors for sensing interruption of light from the source and an aperture associated with each of the detectors through which light emitted from the source is received by the detectors.

First, while precise mounting of the detectors and apertures relative to the light source is required in the assembly of the detection apparatus of the present invention, there are only a few components to mount as compared to the multiplicity of light sources and detectors in the prior art apparatus.

Second, the resolution of the apparatus of the present invention is greatly improved over that of the prior art. Particularly, a solid pattern of light is continuously emitted through the work area where the position of a passive object is to be detected and the apertures respectively configure coincident fields of light from the detection area for the detectors to view so that all possible locations of light interruption within the work area will be seen by the detectors.

Third, the overall complexity and cost of the circuitry required to operate the detectors and light source of the present invention are greatly reduced in comparison with that of the prior art apparatus.

Accordingly, the present invention broadly relates to position detection apparatus comprising means defining an open work area, means arranged partially about the work area so as to provide continuous emission of light therethrough from angularly displaced adjoining portions of the perimeter thereof, means located adjacent the work area at opposite ends of the light emission means for respectively viewing first and second coincident fields of light emitted through the work area, and means for receiving the fields of light and sensing the interruption of light at any location within the fields.

More particularly, the light receiving and sensing means comprises a pair of linear image detector devices, each being located at one of the opposite ends of the light emission means, while the viewing means comprises an aperture-defining device located at each of the opposite ends of the light emission means between the respective detector devices and the work area. Further, the light emission means comprises a light source and upper and lower spaced apart structures located between the work area and the light source and defining an elongated slit for directing a solid pattern of light into the work area from the light source.

In the preferred embodiment, the position detection apparatus is comprised by a generally rectangular frame having four sides and an open interior, means on the frame for emitting light through the interior of the frame from three sides thereof, a pair of linear image detector devices being respectively mounted on the frame at the two corners thereof located at opposite ends of a fourth side thereof, and aperture-defining means located at each of the two frame corners and between the detector devices and the frame interior for configuring coincident fields of light therefrom for the detector devices to view. Each of the detector devices is capable of receiving its respective field of light from the frame interior and sensing interruption of light at any location within the field.

BRIEF DESCRIPTION OF THE DRAWINGS

FIG. 1 is a perspective view of position detection apparatus incorporating the principles of the present invention, with a top cover structure being removed from the frame of the apparatus to expose the arrangement of the light source of the apparatus on the frame.

FIG. 2 is an enlarged perspective view of a linear image detector device and aperture-defining device located at one of the corners of the frame of the apparatus shown in FIG. 1.

FIG. 3 is an enlarged fragmentary top plan view of the image detector device and aperture-defining device of FIG. 2.

DETAILED DESCRIPTION OF THE INVENTION

Figure 4:
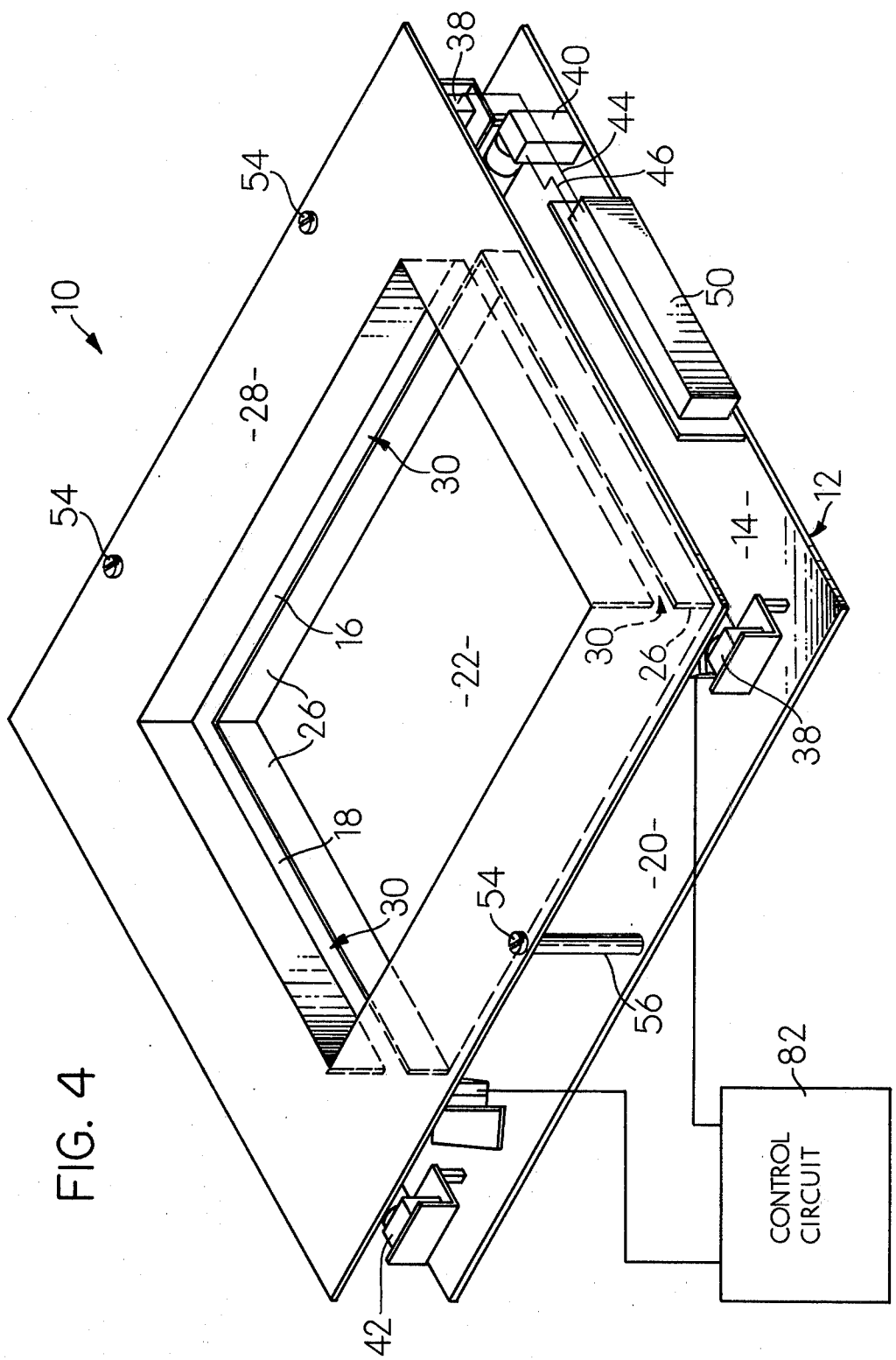
FIG. 4 is a perspective view similar to that of FIG. 1, but with the top cover structure assembled on the apparatus frame.

Referring to the drawings, and particularly to FIGS. 1 and 4, there is shown the preferred embodiment of the position detection apparatus of the present invention, being generally designated 10.

The apparatus 10 includes means defining a generally open work area, preferably taking the form of a generally rectangular frame 12 having four interconnected sides 14, 16, 18, 20 and an open interior 22. The open interior 22 constitutes the work area into which a passive object, such as a human finger or a pencil, can be placed for detection of its location therein upon operation of the apparatus 10.

For illumination of the work area, the apparatus 10 incorporates means arranged at least partially about the work area 22 so as to provide continuous emission of light through the work area 22 from angularly displaced adjoining portions of the perimeter thereof. The means for emitting light into the work area 22 is comprised by a light source, generally designated as 24, and a pair of lower and upper structures 26, 28 located between the work area 22 and the light source 24 and defining an elongated slit 30 for directing a solid pattern of light into the work area 22 from the light source 24.

As seen in FIG. 1, the light source 24 bounds the perimeter of the work area 22 along the first, second and third sides 14, 16, 18 of the apparatus frame 12. While the particular light source 24 illustrated in FIG. 1 is composed of three fluorescent lamps 32, 34, 36 respectively supported by and electrically plugged in pairs of spaced apart sockets 38, 40, 42 being mounted appropriately at the four corners of the frame 12 and electrically connected by wires 44, 46, 48 to respective lamp ballasts 50, 52 supported on first and third sides 14, 18 of the frame 12, it should be understood that other types of generally low intensity light sources may be utilized.

The light emitted by the light source 24 into the work area 22 is restricted by the lower and upper structures 26, 28 to entry through the slit 30 defined by the structures 26, 28. The lower structure 26 is in the form of three narrow interconnected elongated strips attached to and extending upwardly above the interior edges of the first, second and third sides 14, 16, 18 of the apparatus frame 12. The upper structure 28 is formed by an annularly-shaped flat cover sheet having three down-turned interconnected flanges which extend toward, but terminate short of the three elongated strips forming the lower structure 26 so as to define the slit 30 therebetween, of uniform width as seen in FIG. 4. The upper structure 28 rests on and is attached by screws 54 to the upper ends of three upright posts 56 mounted on the second and fourth sides 16, 20 of the frame 12.

Figure 5:
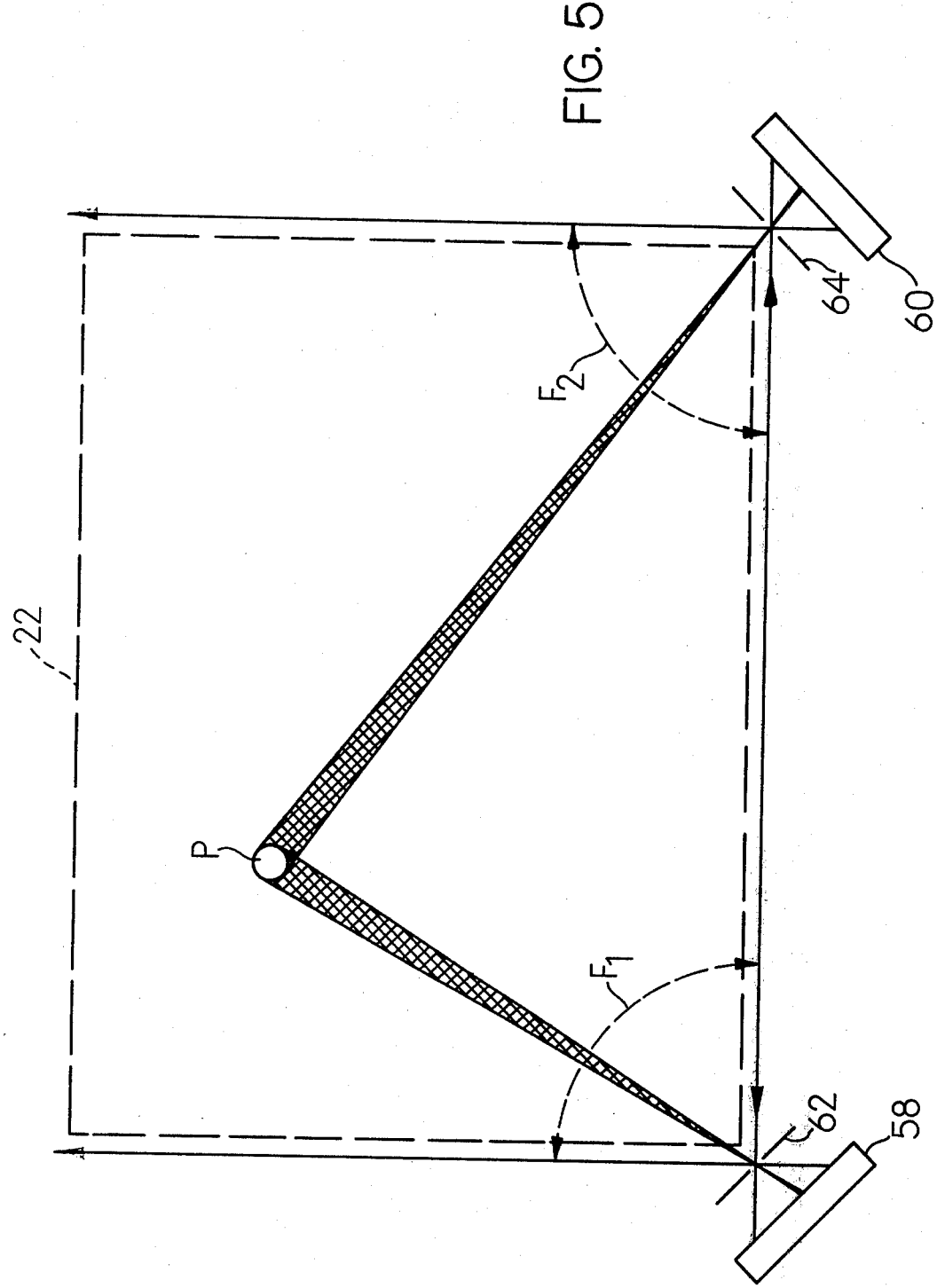
FIG. 5 is a schematic representation of the position detection apparatus illustrating a passive object located within the work area of the apparatus and interrupting the fields of light configured by the aperture-defining devices and received by the detector devices.

Detection of the location of a passive object P placed within the illuminated work area 22 of the apparatus 10, such as illustrated in FIG. 5, is carried out by means located adjacent the work area 22 at opposite ends of the light source 24. As seen in FIG. 1, such locations of the detection means are at the two corners of the apparatus frame 12 being formed respectively by the first and fourth sides 14, 20 and the third and fourth sides 18, 20 thereof.

As seen in FIG. 1 and in greater detail in FIG. 2 (where only one of the detector means is illustrated), the detector means is in the form of a pair of linear image detector devices 58, 60 and a pair of aperture-defining devices 62, 64. The linear image detector devices 58, 60 are respectively supported by and electrically plugged in sockets 66, 68 which, in turn, are supported on upright brackets 70, 72 respectively mounted at the two corners of the frame 12. Each of the aperture-defining devices 58, 60 is mounted to the front side of a respective one of the linear image detector devices 58, 60. The first detector and aperture devices 58, 62 are positioned by the bracket 70 so as to face diagonally across the work area 22 toward a first portion of the light source 24 (i.e., lamps 32, 34) being mounted along the first and second sides 14, 16 of the apparatus frame 12. The second detector and aperture devices 60, 64 are positioned by the bracket 72 so as to face diagonally across the work area 22 toward a second portion of the light source 24 (i.e., lamps 34, 36) being mounted along the second and third sides 16, 18 of the apparatus frame 12.

Referring now to FIG. 3, there is shown in greater detail the first aperture-defining device 62 mounted on the front side of the first detector device 58. The device 62 is in the form of a rectangular piece of photographic film 74 which is spaced forwardly of and attached to the detector device 58 by a pair of spaced apart blocks 76, 78. The film piece 74 has a centrally-located, vertically-extending narrow slot 80 which forms an aperture which allows approximately a ninety degree angular field of view of the work area 22. Since the first detector and aperture devices 58, 62 face toward the first portion of the light source 24 mounted along the first and second sides 14, 16 of the apparatus frame 12, a first field of light $F_1$ (FIG. 5) being emitted from the first light source portion (i.e., lamps 32, 34) through the work area 22 is viewed through the aperture 80 and, in turn, projected thereby on the front surface of the first detector device 58.

The construction of the second aperture-defining device 64, its angular field of view of the work area 22 and its mounting relationship on the second detector device 60 are identical to that just described in reference to the first aperture-defining device 62, except that, since the second detector and aperture devices 60, 64 face toward the second portion of the light source 24 (i.e., lamps 34, 36) mounted along the second and third sides 16, 18 of the apparatus frame 12, a second field of light $F_2$ (FIG. 5) being emitted from the second light-source portion through the work area 22 is viewed through the aperture of the second aperture-defining device 64 and, in turn, projected thereby on the front surface of the second detector device 60. The first and second detector and aperture devices 58, 62 and 60, 64 are precisely aligned relative to their respective first and second light source portions such that their corresponding first and second fields of light $F_1$, $F_2$ are coincident in the sense that the fields each cover the entire work area 22, as seen in FIG. 5. Thus, the placement of a passive object P at any position or location within the work area 22 will be within the respective field of view of each of the linear detector devices 58, 60.

Each of the linear image detector devices 58, 60 is of the electronic image sensor type, an example of which is a charge-coupled device commercially available from Fairchild Camera and Instrument Corporation of Mountain View, CA, designated as Model No. CCD110. This type of device has a surface capable of absorbing light energy projected thereon and an adjacent surface containing a series of conductive electrodes arranged thereon in a linear array in which the electrodes correspond to equal angular contiguous segments of the field of light viewed by the light-absorbing surface 81 (FIG. 3) of the device. Within the semiconductive material of the device, a quantity of packet of electrical charge proportional to the intensity of the light within each of the contiguous segments of the field of light absorbed by the device is stored in regions of the material in close proximity to each corresponding electrode in the linear array thereof. In this manner, a spatial linear array of charges is stored in the device which provides an electrical representation of the linear image of the work area 22 as viewed by the device through the aperture of the respective aperture-defining device associated therewith. Thus, when a passive object is placed in the work area 22, it will interrupt the flow of light in one or more adjacent segments of the fields of light to the respective devices 58, 60. This interruption will be represented in the devices by less charge being stored in proximity to the one or more electrodes which correspond to the interrupted segments in the fields of light received by the devices 58, 60. The array of charges stored by the charge-coupled device can be transferred into adjacent registers with the property of being able to, under control of several clock and transfer signals, serially transfer the packets of charge out of the device and into a detector and preamplifier stage. The signal is then passed through an amplifier and to the output of the device. For a more detailed explanation of the structure and theory of operation of charge-coupled devices, attention is directed to the following articles:

1. "New MOS Technique Points Way to Junctionless Devices," *Electronics*, May 11, 1970.
2. "The New Concept for Memory and Imaging: Charge Coupling," *Electronics*, June 21, 1971.
3. "Charge-Coupling Improves Its Image, Challenging Video Camera Tubes," *Electronics*, Jan. 18, 1973.
4. "Charge-Coupled Devices Move in on Memories and Analog Signal Processing," *Electronics*, Aug. 8, 1974.

As also seen in FIGS. 1 and 4, a control circuit, generally designated 82, will be associated with the apparatus 10 which is designed to respond to any interruption of light sensed by the detectors 58, 60 for determining where in the respective fields of light $F_1$, $F_2$ the interruption occurred. Particularly, the X-Y coordinates of the light interruption location, and, thus, of the physical position of the passive object P, within the frame work area 22 may be determined by the circuit 82.

The control circuit 82 is not a part of the present invention, and a detailed description of the same is not necessary for a thorough and complete understanding of the physical arrangement of the parts of the apparatus which constitute the present invention. Suffice it to say that the circuit 82 is capable of successively receiving each of the stored charge packets of the devices 58, 60 and correlating the same to each of the successive angular contiguous segments which make up the respective fields of light $F_1$, $F_2$ for determining where in the respective fields the interruption occurred.

While in the preferred embodiment a generally rectangular-shaped work area 22 is defined by the frame 12, it should be understood that the work area may take some other multi-sided or even semicircular shape. Correspondingly, the source of light may be arranged in conformity with the shape of the work area so as to extend along angularly displaced adjoining portions of the perimeter of the work area. Further, as in the preferred embodiment, the linear image detector devices and aperture-defining devices would be aligned at the opposite ends of the light source so as to view coincident fields of light which cover the work area.

Having thus described the invention, what is claimed is:

1. Position detection apparatus, comprising:
   means defining an open work area;
   means arranged partially about said work area so as to provide continuous emission of a solid pattern of light through said work area from angularly displaced adjoining portions of the perimeter thereof;
   means located adjacent said work area at opposite ends of said light emission means for respectively defining first and second coincident fields of light emitted through and encompassing said work area from said light emission means with a portion of said light in each of said first and second coincident fields being emitted from a common portion of said light emission means; and
   means located adjacent each of said opposite ends of said light emission means and adjacent said each field defining means for viewing and receiving a corresponding one of said respective first and second fields of light in contiguous angular segments thereof and sensing the interruption of light in one or more of said segments of said respective field and thereby at any location within said work area.

2. Position detection apparatus as recited in claim 1, wherein said light emission means comprises:
   a light source; and
   upper and lower spaced apart structures located between said work area and said light source and defining an elongated slit for directing said solid pattern of light into said work area from said light source.

3. Position detection apparatus as recited in claim 1, wherein said light receiving and sensing means comprises an image detector device located at each of said opposite ends of said light emission means.

4. Position detection apparatus as recited in claim 3, wherein each of said image detector devices is a charge-coupled device.

5. Position detection apparatus as recited in claim 1, wherein said field defining means comprises an aperture-defining device located at each of said opposite ends of said light emission means between said respective detector device and said work area.

6. Position detection apparatus as recited in claim 5, wherein the aperture defined by each of said aperture-defining devices extends in a generally vertical direction.

7. Position detection apparatus, comprising:
   a generally rectangular frame having four sides and an open interior;
   means for emitting a solid pattern of light through the interior of said frame from first, second and third sides thereof;
   means located at opposite ends of the fourth side of said frame for respectively configuring first and second coincident fields of light emitted through the interior of said frame respectively from said first and second adjacent sides of said frame and from said second and third adjacent sides thereof; and an image detector located at said each opposite end of said fourth side of said frame and adjacent said each field configuring means for respectively receiving light within a corresponding one of said first and second fields in equal contiguous angular segments thereof, said each detector capable of sensing the interruption of light in one or more of said segments of its respective field and thereby at any location within both fields.

8. Position detection apparatus as recited in claim 7, wherein said each image detector is a charge-coupled device.

9. Position detection apparatus as recited in claim 7, wherein said configuring means located at each opposite end of said fourth side of said frame defines a vertically-extending slit through which said respective one of said first and second fields of light are received by a corresponding one image detector.

10. Position detection apparatus, comprising:
a generally rectangular frame having an open interior;
means on said frame for emitting a solid pattern of light through the interior of said frame from three sides thereof;
a pair of image detectors, each being mounted on said frame at one of two corners thereof being located at opposite ends of a fourth side thereof; and
aperture-defining means located at each of said two corners of said frame between said detectors and the interior of said frame for configuring coincident fields of light from the frame interior for said detectors to view, each of said detectors being capable of receiving its respective field of light from said frame interior in equal contiguous angular segments thereof and sensing interruption of light in one or more of said segments of its respective field and thereby at any location within said field.

11. Position detection apparatus as recited in claim 10, wherein said detectors and aperture-defining means face in generally diagonal directions across said interior of said frame from said respective two corners thereof.

* * * * *